(12) United States Patent
Ryu et al.

(10) Patent No.: US 7,701,548 B2
(45) Date of Patent: Apr. 20, 2010

(54) LIQUID CRYSTAL DISPLAY DEVICE AND METHOD FOR MANUFACTURING THE SAME

(75) Inventors: Jae Choon Ryu, Gumi-si (KR); Se Joon Baek, Busan-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/478,448

(22) Filed: Jun. 30, 2006

(65) Prior Publication Data

US 2007/0153212 A1  Jul. 5, 2007

(30) Foreign Application Priority Data

Dec. 30, 2005  (KR) .................. 10-2005-0134996

(51) Int. Cl.
*G02F 1/1339* (2006.01)
*G02F 1/1341* (2006.01)
(52) U.S. Cl. .................. 349/190; 349/153; 349/189
(58) Field of Classification Search ............... 349/190, 349/189
See application file for complete search history.

(56) References Cited

U.S. PATENT DOCUMENTS

2004/0041976 A1* 3/2004 Kida et al. ................ 349/187

2005/0134786 A1* 6/2005 Park et al. ................ 349/153

FOREIGN PATENT DOCUMENTS

CN          1627137          6/2005

* cited by examiner

*Primary Examiner*—Uyen-Chau Le
*Assistant Examiner*—Chris Chu
(74) *Attorney, Agent, or Firm*—McKenna Long & Aldridge LLP

(57) ABSTRACT

An LCD device and a method for manufacturing the same is disclosed, to prevent a sealant from being coagulated or disconnected at a predetermined portion, the method comprising preparing lower and upper substrates; dispensing a sealant on any one of the lower and upper substrates by a dispenser; dispensing liquid crystal on any one of the lower and upper substrates; and bonding the lower and upper substrates to each other, wherein the process of dispensing the sealant includes sequential steps of dispensing a first dummy sealant in the periphery of a main sealant pattern, dispensing the main sealant pattern after forming the first dummy sealant, and dispensing a second dummy sealant pattern in the periphery of the main sealant pattern after forming the main sealant pattern.

10 Claims, 7 Drawing Sheets

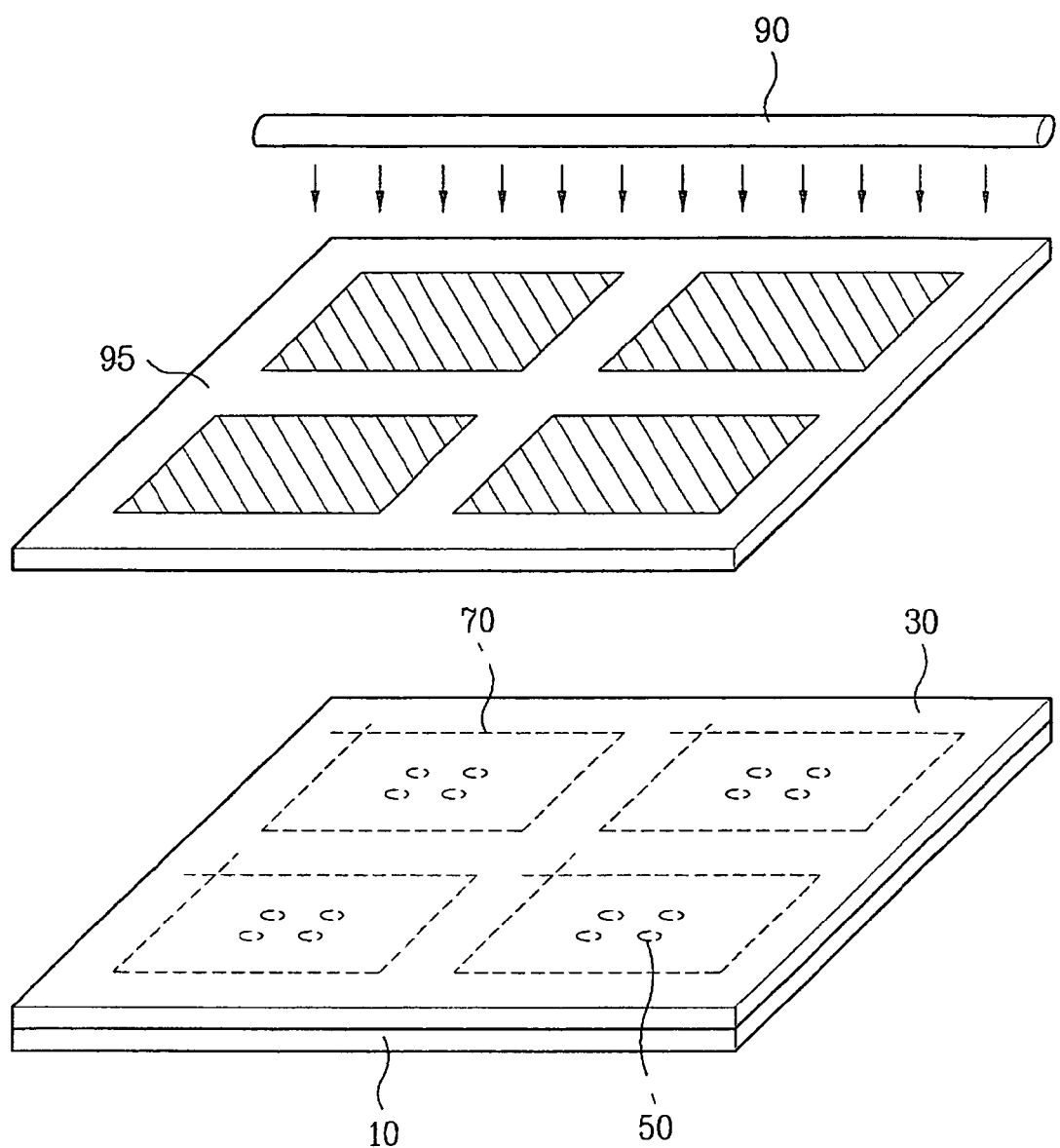

LIQUID CRYSTAL DISPLAY DEVICE AND METHOD FOR MANUFACTURING THE SAME

This application claims the benefit of the Korean Application No. P2005-134996 filed on Dec. 30, 2005, which is hereby incorporated by reference for all purposes as if fully set forth herein. This application incorporates by reference co-pending application Ser. No. 10/184,096, filed on Jun. 28, 2002 entitled "SYSTEM AND METHOD FOR MANUFACTURING LIQUID CRYSTAL DISPLAY DEVICES FROM LARGE MOTHER SUBSTRATE PANELS"; and co-pending application Ser. No. 11/476,919, filed on Jun. 29, 2006, entitled "METHODS OF MANUFACTURING LIQUID CRYSTAL DISPLAY DEVICES" for all purposes as if fully set forth herein.

BACKGROUND OF THE INVENTION

1. Field of the Invention

The present invention relates to a sealant dispensing method of a liquid crystal display (LCD) device, and more particularly, to a sealant dispensing method of an LCD device by a liquid crystal dispensing method.

2. Discussion of the Related Art

Among various ultra-thin flat type display devices, which include a display screen having a thickness of several centimeters, a liquid crystal display (LCD) device can be widely used for notebook computers, monitors, aircraft, and etc. since it has advantages of low power consumption and portability.

The LCD device is manufactured by steps of preparing a lower substrate having a thin film transistor and a pixel electrode on a transparent substrate; preparing an upper substrate having a black matrix layer, a color filter layer, and a common electrode on a transparent substrate; and forming a liquid crystal layer between the lower and upper substrates.

At this time, the method for forming the liquid crystal layer between the lower and upper substrates is classified into a liquid crystal injection method and a liquid crystal dispensing method.

In the liquid crystal injection method, a sealant is dispensed in a pattern having an inlet on any one of lower and upper substrates, and the lower and upper substrates are bonded to each other. Then, liquid crystal is injected to a space between the lower and upper substrates through the inlet of the sealant.

In the liquid crystal dispensing method, a sealant is dispensed in a pattern having no inlet on the lower substrate, and liquid crystal is dispensed on the lower substrate. Then, the lower and upper substrates are bonded to each other.

In case of the liquid crystal injection method, it may take a long time to inject the liquid crystal into the space between the lower and upper substrates, thereby decreasing the production yield. For example, if manufacturing a large-sized LCD device by the liquid crystal injection method, it takes a long time for injection of liquid crystal. To this end, the manufacturer of large-sized LCD devices has become generally performed using the liquid crystal dispensing method.

The method for dispensing the sealant of the pattern having no inlet by the liquid crystal dispensing method is classified into a screen printing method and a dispensing method using a dispenser. If applying the screen printing method, the screen may come into contact with a substrate, whereby it may damage an alignment layer of the substrate. In this respect, the dispensing method is used generally.

Hereinafter, a related art dispensing method will be explained with reference to the accompanying drawings.

FIG. 1 is a schematic view of a sealant dispensing method using a dispenser according to the related art.

First, as illustrated in FIG. 1, the related art dispenser is provided with a syringe 10 and a nozzle 20.

The syringe 10 has a sealant 15 therein. The nozzle 20 is connected to a lower end of the syringe 10 to supply the sealant 15 to a substrate 1.

The dispenser moves along a direction (as indicated by the arrow in the figure) from a starting point (s) of the substrate 1, and then returns to the starting point (s) of the substrate 1, forming a closed sealant path. As the dispenser moves along the substrate, the sealant 15 is discharged to the substrate 1 through the nozzle 20. Accordingly, the sealant 15 of the pattern having no inlet is dispensed to the substrate 1.

However, the related art sealant dispensing method has the following disadvantages.

First, because the sealant 15 has a particular viscosity, the sealant 15 may coagulate in the end of the nozzle 20 of the dispenser. Thereafter, when the sealant material is supplied to the starting point (s) of the substrate 1 through the nozzle 30, the coagulated sealant is discharged to the starting point (s) of the substrate 1. In addition, because the dispenser moves along the arrow direction from the starting point (s) of the substrate 1, and then turns back to the starting point (s) of the substrate 1, the coagulated sealant 15 may be excessively dispensed to the starting point (s) of the substrate 1. In this case, when bonding the two substrates to each other, the sealant 15 spreads to the inside of the substrate 1 in which the liquid crystal is formed. Thus, the liquid crystal dispensed on the substrate 1 may be contaminated due to the spread of sealant.

Second, to prevent the sealant 15 from being coagulated at the starting point (s), the dispenser may be stopped before the starting point (s). In this case, the sealant 15 can be disconnected. That is, the liquid crystal flows to the outside through the portion of the sealant.

SUMMARY OF THE INVENTION

Accordingly, the present invention is directed to an LCD device and a method for manufacturing the same, which substantially obviates one or more problems due to limitations and disadvantages of the related art.

An advantage of the present invention is to provide a method for manufacturing an LCD device to prevent a sealant from being coagulated or disconnected at a predetermined portion.

Another advantage of the present invention is to provide an LCD device to prevent a sealant from being coagulated or disconnected at a predetermined portion.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a method for manufacturing an LCD device comprises preparing first and second substrates; dispensing a sealant on one of the first and second substrates using a dispenser; dispensing liquid crystal on one of the first and second substrates; and bonding the first and second substrates to each other, wherein dispensing the sealant includes sequential steps of dispensing a first dummy sealant in the periphery of a main sealant pattern, dispensing the main sealant pattern after forming the first dummy sealant, and dispensing a second dummy sealant pattern in the periphery of the main sealant pattern after forming the main sealant pattern.

Before dispensing the main sealant pattern, the first dummy sealant is formed in the periphery of the main sealant pattern. After dispensing the main sealant pattern, the second dummy sealant is formed in the periphery of the main sealant pattern. That is, the starting and ending points of the sealant dispensing are formed in the periphery of the main sealant pattern, whereby it is possible to prevent the main sealant pattern from being coagulated or disconnected.

At this time, the first and second dummy sealants extended from the main sealant pattern and the extended direction of the first dummy sealant is different from the extended direction of the second dummy sealant. Also, the process of dispensing the sealant comprises dispensing the first dummy sealant adjacent to one corner of the main sealant pattern in the periphery of the main sealant pattern wherein the main sealant pattern is substantially rectangular; dispensing the main sealant pattern after forming the first dummy sealant; and dispensing the second dummy sealant adjacent to one corner of the main sealant pattern in the periphery of the main sealant pattern after forming the main sealant pattern. Also, wherein the first and second dummy sealants extend from the main sealant pattern and the first dummy sealant extends in a direction substantially perpendicular direction of the second dummy sealant.

In addition, the method includes an additional process for curing the sealant after bonding the two substrates to each other.

In another aspect of the present invention, an LCD device comprises first and second substrates facing each other; a liquid crystal layer formed between the first and second substrates; and a sealant surrounding the liquid crystal layer between the first and second substrates, wherein the sealant includes a main sealant pattern, and first and second dummy sealant patterns extended from the main sealant pattern and formed in the periphery of the main sealant pattern.

he direction of the first dummy sealant pattern is different from the direction of the second dummy sealant pattern.

Also, the main sealant pattern is formed in a substantially rectangular shape, and the first and second dummy sealants are extended from one corner of the rectangular main sealant pattern. Also, the first and second dummy sealants are vertically formed adjacent to one corner of the rectangular main sealant pattern.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2A to 2D are perspective views illustrating a method for manufacturing an LCD device according to an embodiment of the present invention;

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Hereinafter, a method for manufacturing an LCD device according to the present invention will be explained with reference to the accompanying drawings.

FIGS. 2A to 2D are perspective views illustrating a method for manufacturing an LCD device according to an embodiment of the present invention.

Figure 1:
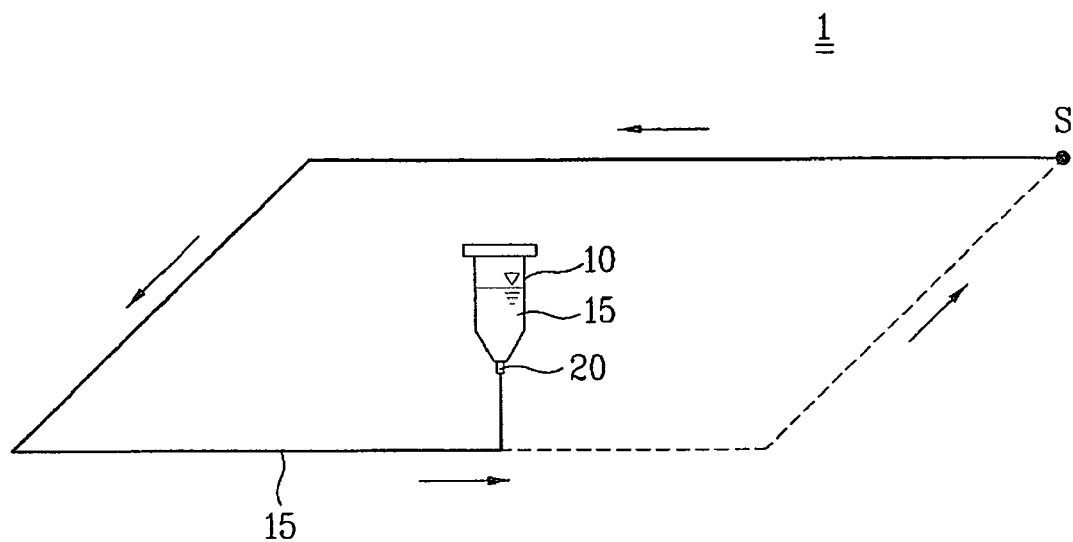
FIG. 1 is a schematic view illustrating a sealant dispensing method using a dispenser according to the related art.
Figure 2A:
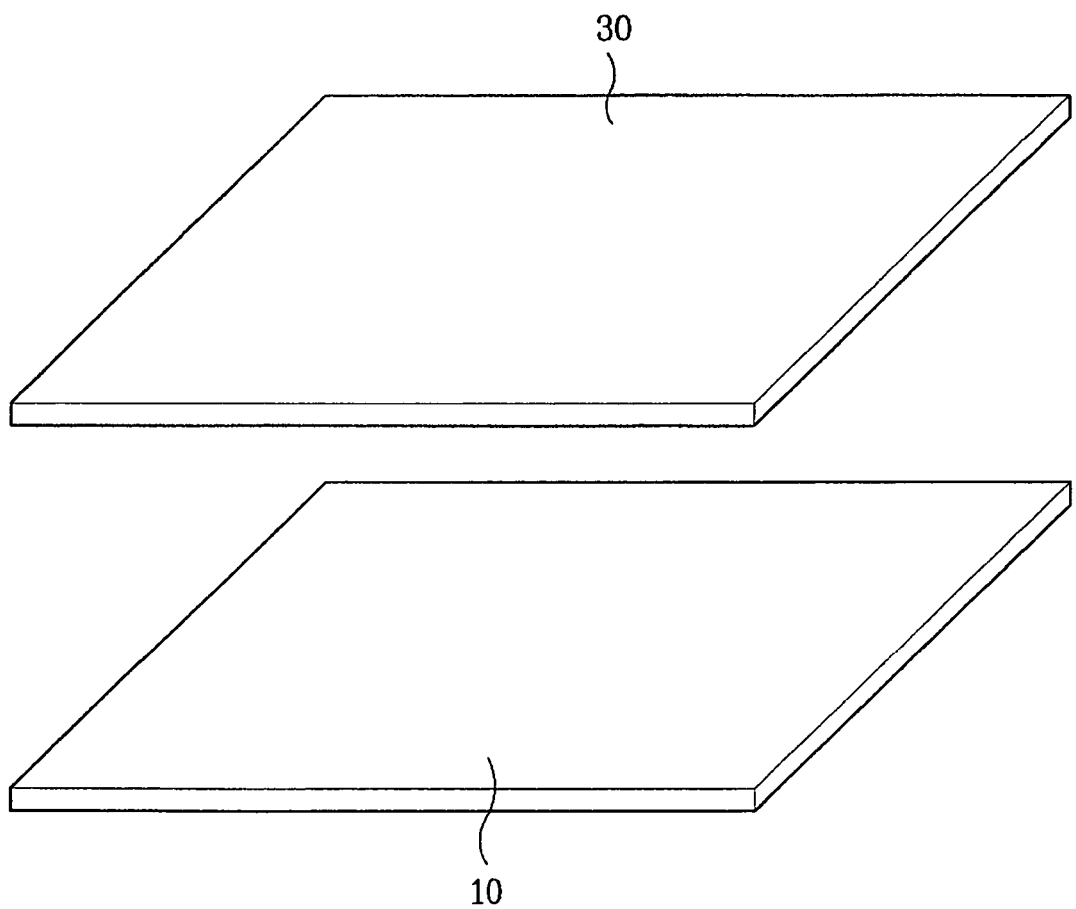

First, as illustrated in FIG. 2A, a first substrate 10 and a second substrate 30 are prepared.

Although not illustrated, the first substrate 10 includes a plurality of gate and data lines, a plurality of thin film transistors, and a plurality of pixel electrodes. Each gate line is substantially perpendicular to each data line to define a plurality of unit pixel regions. Also, each thin film transistor is formed adjacent to a crossing portion of the gate and data lines, wherein the thin film transistor includes a gate electrode, a gate insulating layer, a semiconductor layer, an ohmic contact layer, source and drain electrodes, and a passivation layer. Each pixel electrode is formed in the unit pixel region, wherein the pixel electrode is electrically connected with the thin film transistor.

Although not illustrated, the second substrate 30 includes a black matrix layer, a color filter layer, and a common electrode. The black matrix layer shields the gate line, the data line, and the thin film transistor from light. The color filter layer of red, green, and blue patterns is formed on the black matrix layer. The common electrode is formed on the color filer layer. Also, an overcoat layer may be additionally formed between the color filter layer and the common electrode.

In case of an In-Plane Switching (IPS) mode LCD device, the common electrode is formed substantially parallel to the pixel electrode on the first substrate, to thereby induce a transverse electric field.

Also, an alignment layer for initial alignment of liquid crystal may be formed on each of the lower and upper substrates 10 and 30. The alignment layer may be formed by rubbing method or a photo-alignment method.

A spacer for maintaining a cell gap between the lower and upper substrates 10 and 30 formed on any one of the lower and upper substrates 10 and 30. The spacer may be formed of a ball spacer or a column spacer.

Figure 2B:
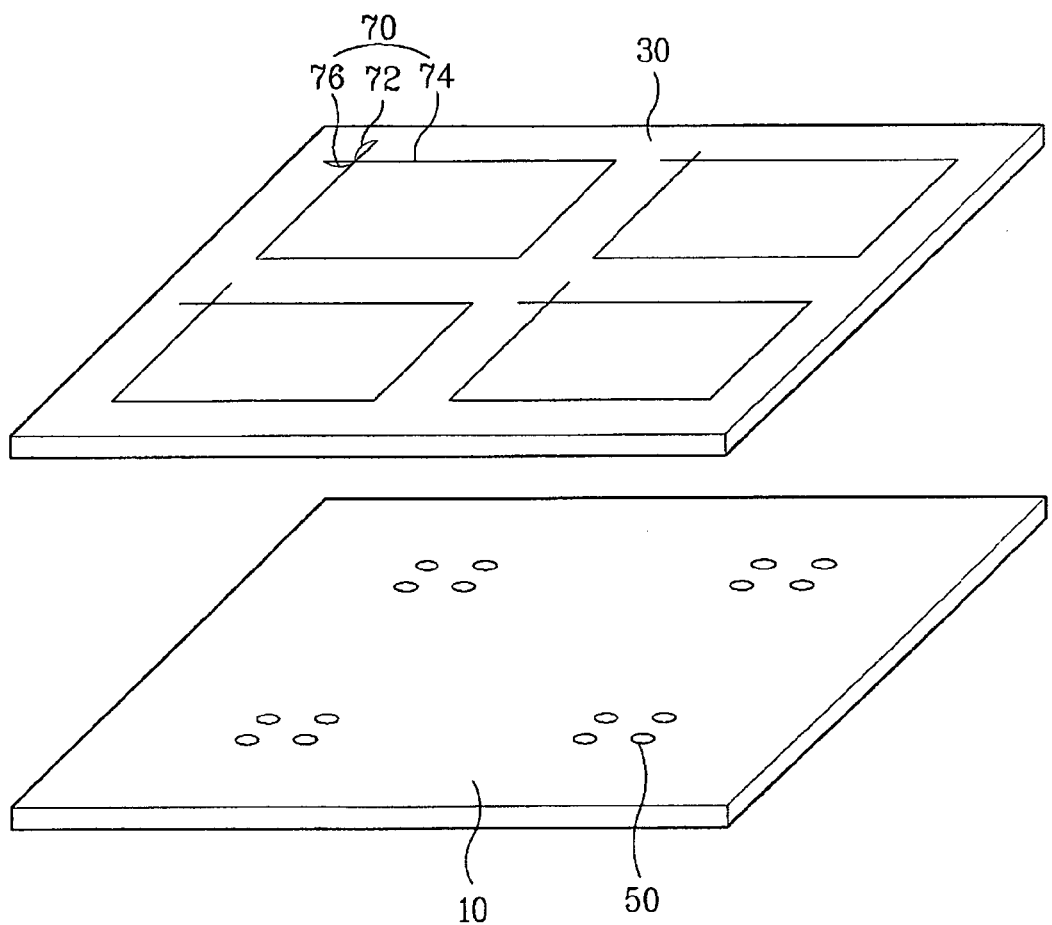

As illustrated in FIG. 2B, liquid crystal 50 may be dispensed on a first substrate 10 to thereby form a liquid crystal layer. A sealant 70 may be dispensed on a second substrate 30. Although not illustrated here, the liquid crystal 50 and sealant may be dispensed on the same substrate.

The sealant 70 includes a main sealant pattern 74, and first and second dummy sealants patterns 72 and 76 extended from the main sealant pattern 74 and formed in the periphery of the main sealant pattern 74.

The sealant 70 is dispensed on the upper substrate 30 by a dispenser, and the dispenser will be explained with reference to FIGS. 3A to 3C.

Figure 3A:
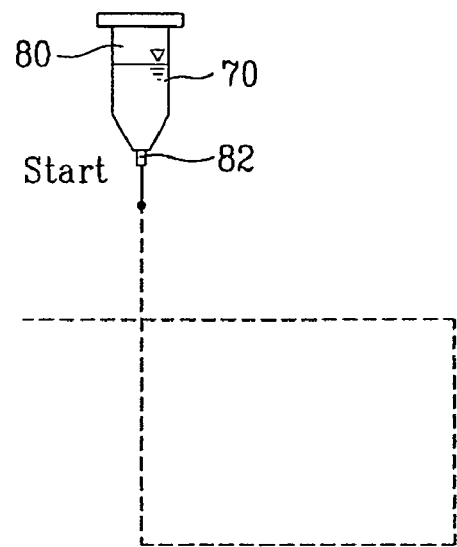
FIGS. 3A to 3C are schematic views of a sealant dispensing method using a dispenser according to an embodiment of the present invention.

As in FIG. 3A, the dispenser includes a syringe 80 having the sealant 70 therein, and a nozzle 82 connected to a lower end of the syringe 80.

The dispenser is positioned in the periphery of the main sealant pattern. The main sealant pattern corresponds to a rectangular pattern. That is, the dispenser is positioned adjacent to one corner of the rectangular pattern along which the main sealant pattern will be formed.

Figure 3B:
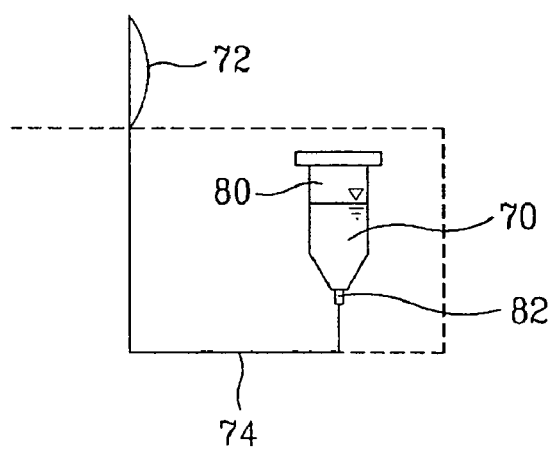

As illustrated in FIG. 3B, the first dummy sealant pattern 72 by the dispenser and then the main sealant pattern 74 is formed.

Figure 3C:
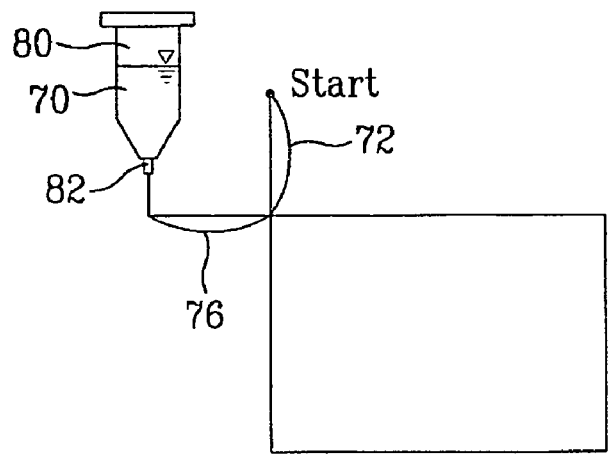

As illustrated in FIG. 3C, after completing the main sealant pattern 74, the dispensing is performed to the periphery of the main sealant pattern 74, to thereby form the second dummy sealant pattern 76. Accordingly, it is possible to form the first and second dummy sealant patterns 72 and 76 being formed adjacent to one corner of the rectangular main sealant pattern 74, extending from respective line sections of the main sealant pattern 74.

After forming the first dummy sealant pattern 72 in the periphery of the main sealant pattern 74, the rectangular main sealant pattern 74 is formed. Then, the second dummy sealant pattern 76 is formed substantially perpendicular to the first dummy sealant pattern 72 in the periphery of the main sealant pattern 74.

Accordingly, the starting and ending points of dispensing are formed in the periphery of the main sealant pattern 74, so that it is possible to prevent the main sealant pattern 74 from including coagulated sealant or being disconnected.

As the main sealant pattern 74 is not coagulated, preventing the liquid crystal positioned inside the main sealant pattern 74 from being contaminated. Also, the main sealant pattern 74 has no disconnection, preventing the liquid crystal from flowing to the outside of the main sealant pattern 74.

The sealant 70 may be a UV-curing type.

Referring to FIG. 2B, if the liquid crystal 50 contacts the sealant 70 before curing the sealant 70, the liquid crystal 50 is contaminated. Accordingly, it is preferable to dispense the liquid crystal 50 on the central portion of the first substrate 10. As the liquid crystal dispensed on the central portion of the lower substrate 10 spreads slowly until and after curing the sealant 70, the liquid crystal is dispensed at the same density on the entire surface of the first substrate 10.

In the drawings, the liquid crystal 50 is formed on the first substrate 10, and the sealant 70 is formed on the second substrate 30. However, the liquid crystal 50 may be formed on the second substrate 30, and the sealant 70 may be formed on the first substrate 10.

Also, the liquid crystal 50 and the sealant 70 may be formed on the same substrate. If forming the liquid crystal 50 and the sealant 70 on the same substrate, it may cause non-uniformity between the processing times the substrate having the liquid crystal and sealant and the other substrate, thereby increasing the manufacturing time. In this respect, it may be preferred to form the liquid crystal 50 and the sealant 70 on the different substrates.

Figure 2C:
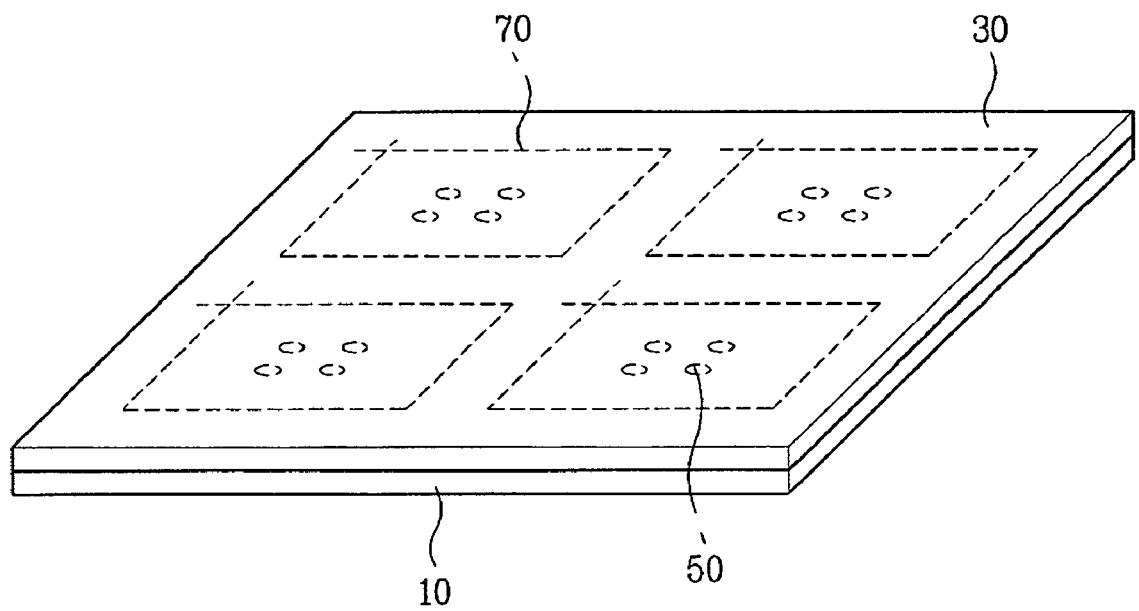

As illustrated in FIG. 2C, the first and second substrates 10 and 30 are bonded to each other. The first substrate 10 may be positioned at a lower position, and the second substrate 30 may be positioned above the first substrate 10. At this time, the surface of the first substrate 10 on which the liquid crystal 50 is dispensed faces to the surface of the second substrate 30 on which the plurality of layers are formed.

As illustrated in FIG. 2D, the sealant 70 is cured. If using the sealant 70 of UV-curing type, as illustrated in FIG. 2D, UV light is applied to the sealant 70 by a UV-irradiation apparatus 90.

If applying UV light onto the entire surface of the bonded substrates, UV light may have bad effects on an active region if the thin film transistor. Also, a pretilt angle of an alignment layer for initial alignment of liquid crystal may be changed due to UV light.

Accordingly, as illustrated in FIG. 2D, the active region is covered with a mask 95, and then UV light is applied to the substrate to cure the sealant.

Even if using the UV-curing sealant 70, a thermal curing process may be additionally performed to the sealant 70 after applying UV light.

Although not illustrated, after applying UV light, the substrate is cut into unit cells, and a final inspection test is performed, thereby completing the LCD device.

Hereinafter, an LCD device according to the present invention will be described with reference to the accompanying drawings.

Figure 4:
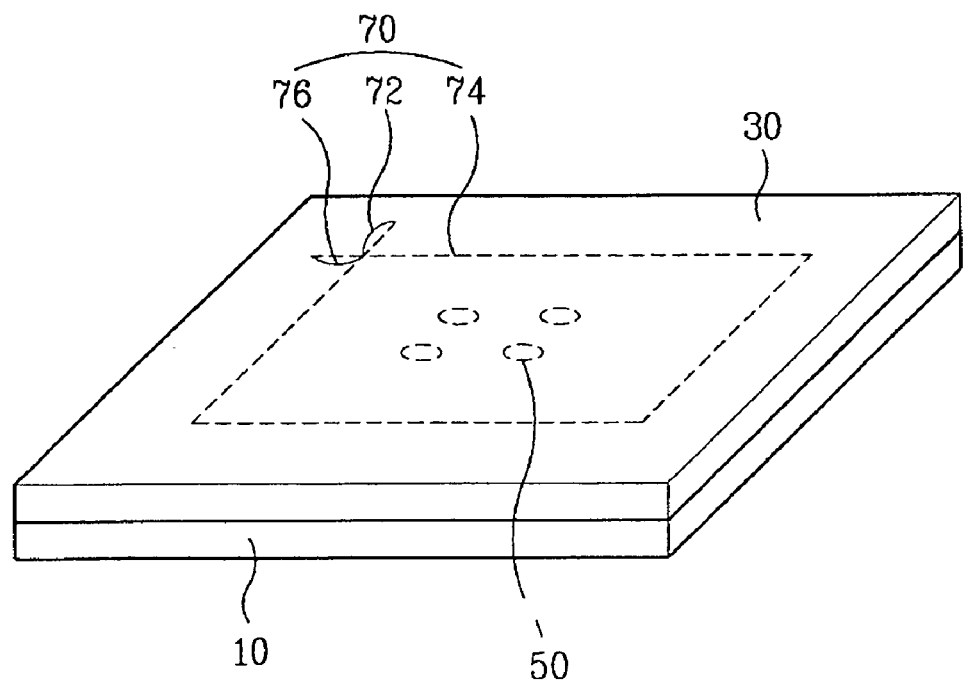
FIG. 4 is a perspective view of an LCD device according to an embodiment of the present invention.

FIG. 4 is a perspective view illustrating an LCD device according to one embodiment of the present invention.

As illustrated in FIG. 4, an LCD device according to one embodiment of the present invention includes a lower substrate 10, an upper substrate 30, a liquid crystal layer 50 formed between the lower and upper substrates 10 and 30, and a sealant 70 surrounding the liquid crystal layer 50 between the lower and upper substrates 10 and 30.

The lower and upper substrates 10 and 30 are similar in structure as those explained above, thus a detailed explanation is omitted.

The sealant 70 includes a main sealant pattern 74, and first and second dummy sealant patterns 72 and 76 extended from the main sealant pattern 74 and formed in the periphery of the main sealant pattern 74.

The first and second dummy sealant patterns 72 and 76 are formed adjacent to one corner of the main sealant pattern 74. Also, the extended direction of the first dummy sealant pattern 72 is different from the extended direction of the second dummy sealant pattern 76.

As illustrated in FIG. 4, the main sealant pattern 74 is formed in a substantially rectangular shape, and the first and second dummy sealant pattern 72 and 76 are formed adjacent to one corner of the substantially rectangular main sealant pattern 74. At this time, the first dummy sealant pattern 72 is substantially perpendicular to the second dummy sealant 76.

The sealant 70 may be a UV-curing type.

Although not illustrated, a spacer for maintaining a cell gap is formed between the lower and upper substrates 10 and 30. The spacer may be of a ball spacer or a column spacer.

As mentioned above, the LCD device and method for manufacturing the same according to the present invention has the following advantages.

Before dispensing the main sealant pattern, the first dummy sealant is formed in the periphery of the main sealant pattern. After dispensing the main sealant pattern, the second dummy sealant is formed in the periphery of the main sealant pattern. That is, the starting and ending points of the sealant dispensing are formed in the periphery of the main sealant pattern, whereby it is possible to prevent the main sealant pattern from being coagulated or disconnected.

As the main sealant pattern has no coagulation, it is possible to prevent the liquid crystal positioned inside the main sealant pattern from being contaminated after bonding the substrates. Also, since the main sealant pattern has no disconnection, the liquid crystal does not flow to the outside of the main sealant pattern after bonding the substrates.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing a liquid crystal display device comprising:

preparing first and second substrates;

dispensing a sealant on one of the first and second substrates using a dispenser;

dispensing liquid crystal on one of the first and second substrates; and bonding the first and second substrates to each other, wherein dispensing the sealant includes sequential steps of dispensing a first dummy sealant in the periphery of a main sealant pattern, dispensing the main sealant pattern after forming the first dummy sealant, and dispensing a second dummy sealant pattern in the periphery of the main sealant pattern after forming the main sealant pattern; and wherein dispensing the sealant further includes:

dispensing the first dummy sealant adjacent to one corner of the main sealant pattern in the periphery of the main sealant pattern wherein the main sealant pattern is substantially rectangular; and dispensing the second dummy sealant adjacent to one corner of the main sealant pattern in the periphery of the main sealant pattern after forming the main sealant pattern.

2. The method of claim 1, wherein the first and second dummy sealants extend from the main sealant pattern and the first dummy sealant extends in a direction different from the direction of the second dummy sealant.

3. The method of claim 1, wherein the first and second dummy sealants extend from the main sealant pattern and the first dummy sealant extends in a direction substantially perpendicular direction of the second dummy sealant.

4. The method of claim 1, wherein the sealant includes a UV-curing sealant.

5. The method of claim 1, further comprising curing the sealant after bonding the first and second substrates to each other.

6. The method of claim 5, wherein the process of curing the sealant comprises applying UV light to the sealant.

7. The method of claim 6, wherein the process of applying UV light to the sealant is performed while covering an active region of the bonded first and second substrates with a mask.

8. The method of claim 1, wherein the sealant and the liquid crystal are formed on the different substrates.

9. A liquid crystal display device, comprising:

first and second substrates facing each other;

a liquid crystal layer formed between the first and second substrates; and a sealant surrounding the liquid crystal layer between the first and second substrates, wherein the sealant includes a main sealant pattern, and first and second dummy sealant patterns extended from the main sealant pattern and formed in an outer periphery of the main sealant pattern, wherein the main sealant pattern is substantially rectangular and the first and second dummy sealant patterns extend from the one corner of the rectangular main sealant pattern and wherein the first dummy sealant pattern is substantially perpendicular to the second dummy sealant pattern.

10. The device of claim 9, wherein the sealant includes of a UV-curing sealant.

* * * * *